(No Model.)

A. E. LEONARD.
TIRE TIGHTENER.

No. 411,866. Patented Oct. 1, 1889.

Witnesses
Henry J. Dieterich
R. W. Bishop.

Inventor
Addison E. Leonard
By his Attorneys

UNITED STATES PATENT OFFICE.

ADDISON E. LEONARD, OF KINSLEY, KANSAS.

TIRE-TIGHTENER.

SPECIFICATION forming part of Letters Patent No. 411,866, dated October 1, 1889.

Application filed April 6, 1889. Serial No. 306,216. (No model.)

*To all whom it may concern:*

Be it known that I, ADDISON E. LEONARD, a citizen of the United States, residing at Kinsley, in the county of Edwards and State of Kansas, have invented a new and useful Wheel, of which the following is a specification.

My invention relates to improvements in wheels; and it consists in certain novel features, hereinafter described and claimed.

Figure 1:
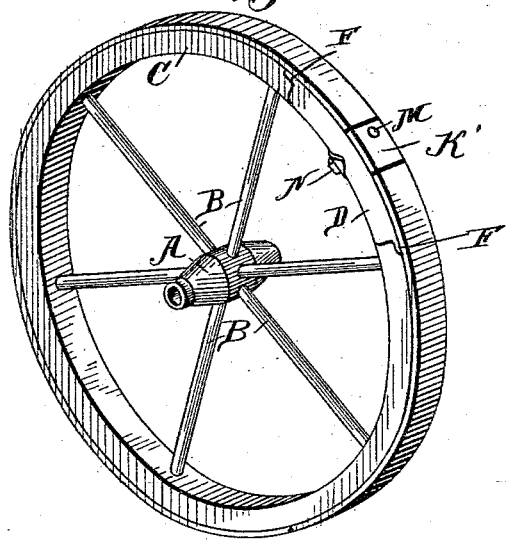
Figure 2:
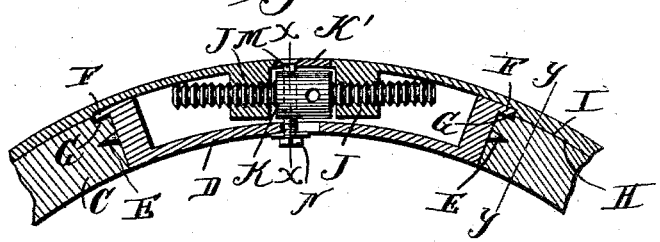
Figure 3:
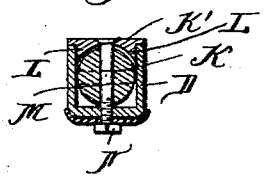
Figure 4:
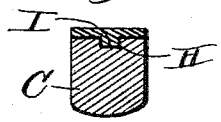

In the accompanying drawings, Figure 1 is a perspective view of a wheel having my improvements applied thereto. Fig. 2 is a longitudinal section of a part of the same. Figs. 3 and 4 are transverse sections on the lines $x$ $x$ and $y$ $y$, respectively, of Fig. 2.

The hub A and the spokes B may be of the usual or any preferred construction, and the felly C is secured on the ends of the spokes in any desired manner. The felly is divided, and in the open space formed by this division I secure the metallic casing D, which is substantially of the same configuration as the felly and is provided at its ends with the spurs or points E, adapted to enter the ends of the parts of the felly, and the lips F, adapted to engage recesses G, formed in the outer sides of the felly. The said casing is thus firmly secured between the ends of the parts of the felly and forms practically a continuation and part of the felly. The felly is provided in its outer side with a central groove H, which is engaged by a central rib I, formed integral with the tire on the inner side of the same, so that the tire will be prevented from moving laterally, and so slipping from the wheel.

The tire is divided and is provided on its inner side at its ends with the inwardly-projecting bosses J, having internally-threaded openings, which are engaged by the threaded ends of a coupling K, as clearly shown. The body of this coupling is provided with diametrical openings, through which a suitable key or turning-pin is inserted, so as to form a lever by which the said coupling may be rotated, so as to tighten or loosen the tire, as will be readily understood. The ends of the coupling are threaded reversely to each other, so that by turning the coupling the ends of the tire will be caused to move in opposite directions, and consequently brought together or separated, as may be desired.

When the tire has been properly adjusted on the wheel, the space between the ends of the same is filled by a small plate K', which is provided on its inner side with longitudinal ribs L, which are adapted to engage the inner sides of the casing D, and so prevent the plate slipping laterally from between the ends of the tire. This plate is secured firmly in position by a bolt M, inserted through the same and through one of the diametrical openings in the coupling, its inner end projecting inward beyond the casing D and having a nut N mounted thereon, the said nut being adapted to be turned up against the casing D to secure the bolt.

The construction and arrangement of the parts of my device being thus made known, the manner of using the same and the advantages to be derived therefrom will, it is thought, be readily understood. In putting together a wheel in accordance with my invention after the hub, spokes, and felly have been fitted together the casing D is secured between the ends of the felly. The tire is then arranged around the felly with its longitudinal rib engaging in the groove in the outer side of the felly, after which the coupling is fitted in the casing with its ends engaging the nuts on the tire, and is then rotated so as to bring the ends of the tire toward each other, and so secure the tire in position. Should the tire become loose from excessive wear, it can be readily tightened by rotating the coupling without necessitating the provision of a new tire or the upsetting of the old one. After the tire has been tightened on the wheel the plate K is secured in position, as before described, and the wheel will be completed.

My device is very simple and can be manufactured at a slight cost, and can be readily operated by an unskilled person.

Having thus described my invention, what I claim, and desire to secure by Letters Patent, is—

In a wheel, the combination of the divided felly having recesses G in its outer side at its ends, the casing D, arranged between the ends of the felly and provided with the spurs or points E, adapted to enter the ends of the felly, and the lips F, adapted to engage the recesses G, the divided tire fitted around the felly and provided at its ends with the integral internally-threaded bosses J, fitting in the casing, the coupling having its ends engaging said threaded bosses and provided at its center with diametrical openings, the plate K, adapted to be arranged between the ends of the tire and provided on its inner side with longitudinal ribs adapted to engage against the sides of the casing, and the bolt passed through said plate and one of the diametrical openings of the coupling, as set forth.

In testimony that I claim the foregoing as my own I have hereto affixed my signature in presence of two witnesses.

ADDISON E. LEONARD.

Witnesses:
I. A. SHAW,
GEO. E. WILSON.